3,119,808
7-(MONOACETOACET MONOARYLIDE)-AZO-4-METHYL-2-HYDROXY-QUINOLINE COLORING MATTERS
Donald Buckley and Joseph Glassman, Manchester, England, assignors to Imperial Chemical Industries Limited, London, England, a corporation of Great Britain
No Drawing. Filed Nov. 14, 1960, Ser. No. 68,693
1 Claim. (Cl. 260—155)

This invention relates to new azo colouring matters and more particularly it relates to new azo colouring matters suitable for the colouration of textile materials, paints, printing inks, rubber, artificial polymeric materials and fibre forming materials.

According to the invention we provide the new azo colouring matters which in one of their tautomeric forms are of the formula:

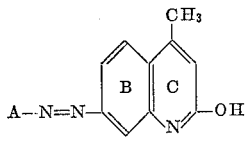

wherein A stands for the residue of a coupling component devoid of sulphonic acid and carboxylic acid groups and the ring B carries not more than 2 substituents selected from the following: halogen atoms, lower alkyl groups and lower alkoxy groups.

As examples of substituents carried by the ring B there may be mentioned chloro, bromo, ethyl, methoxy, ethoxy and iso-propoxy.

As examples of coupling components, the residue of which may be represented by A there may be mentioned phenolic coupling components and those which contain a ketomethylene group. More specifically there may be mentioned the azoic coupling components which are listed on pages 2613 to 2628 of "Colour Index," Second Edition 1956 (published jointly by the Society of Dyers and Colourists and the American Association of Textile Chemists and Colorists). There may also be mentioned the arylides of aceto-acetic acid, benzoylacetic acid and the like; also heterocyclic coupling components for example the pyrazolones and hydroxyquinolines.

According to a further feature of the invention we provide a process for the manufacture of the new azo colouring matters as hereinbefore defined which comprises coupling a coupling component devoid of sulphonic acid and carboxylic acid groups with a diazotised amine of the formula:

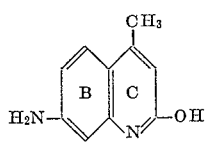

wherein the ring B carries substituents as stated above.

The process of the invention may conveniently be carried out by mixing a solution or suspension of the diazotised amine with an alkaline solution or suspension of the coupling component, stirring the mixture until the coupling is completed and isolating the precipitated colouring matter by filtration and washing, and, if desired, drying the colouring matter.

If desired, mixtures of coupling components or mixtures of the diazotised amines may be used in the process of the invention.

As examples of coupling components which may be used in the process of the invention there may be mentioned azoic coupling components such as β-naphthol and the arylamides of 2-hydroxy-3-naphthoic acid, for example 2-hydroxy-3-naphthoic-anilide, 2-hydroxy-3-naphthoic(5′-chloro-2′ - methylanilide), 2-hydroxy-3-naphthoic(4′-methoxy-2′-methylanilide). There may also be mentioned heterocyclic compounds for example 1-aryl-pyrazolones such as 1-phenyl-3-methyl-pyrazolone, 1-p-tolyl-3-methyl-pyrazolone, 1-(4′-methoxyphenyl)-3-methyl - pyrazolone and quinoline derivatives such as 2:4-dihydroxyquinoline, and especially there may be mentioned acetoacetic and benzoylacetic arylides such as acetoacetanilide, acetoacet-o-toluidide, acetoacet-p-toluidide, acetoacet-o-anisidide, acetoacet-o-chloranilide, acetoacet-p-anisidide, acetoacet-p-chloranilide, acetoacet-2:4-dimethyl-anilide, acetoacet-p-phenetidide, acetoacet-2:5-dimethoxy-anilide, acetoacet-2:4-dimethoxyanilide, acetoacet-4-chloro-2:5-dimethoxyanilide, acetoacet-5-chloro-2:4-dimethoxyanilide and benzoylacetanilide.

The amines used in the process of the invention may be obtained by condensation of the appropriately substituted m-phenylene diamine with acetoacetic ester for example by the process described in "Berichte der Deutsche Chemische Gesellschaft," 1898, volume 31, page 796, for the condensation of m-phenylene diamine with acetoacetic ester to give 7-amino-2-hydroxy-4-methyl quinoline.

As examples of amines which may be used in the process of the invention there may be mentioned 7-amino-2-hydroxy-4:6-dimethyl-quinoline, 7-amino-2-hydroxy-4:5-dimethyl - quinoline, 7-amino-6-methoxy-2-hydroxy-4-methyl-quinoline, 7-amino-2-hydroxy-4:5:8-trimethylquinoline.

The new azo colouring matters of the invention, either singly or in mixtures, in the form of dry powders may be used as pigments for the colouration of paints, giving yellow to violet and deep-blue shades of good fastness to heat and solvents when incorporated in alkyd or other paint media. Alternatively the colouring matters may be used as pigments for colouring artificial polymeric materials, for example polyvinyl chloride, polythene, polystyrene, or cellulose acetate.

By milling the filtered and washed colouring matter obtained from the coupling step with water and a dispersing agent, for example disodium dinaphthylmethane-di-β-sulphonate, the new colouring matters of the invention may be obtained in the form of pigment pastes suitable for the manufacture of emulsion paints, for the colouration of wallpaper, for textile printing, for the colouration of paper and paper laminates, for flushing into paint vehicles or lithographic varnish or for use in the mass pigmentation of fibre forming materials such as viscose.

Amines of the above formula which are of especial value in the process of the invention are those in which the substituents in the ring B are methyl groups, particularly 7-amino-2-hydroxy-4:6-dimethylquinoline, 7-amino-2-hydroxy - 4:5 - dimethylquinoline, 7-amino-2-hydroxy-4:5:8 - trimethylquinoline and 7-amino-6-methoxy-2-hydroxy-4-methylquinoline, since these amines give rise to colouring matters of very good light fastness, especially when used in conjunction with the following coupling components: 2-hydroxy-3-naphthoic(4′-methoxy-2′-methylanilide), 2 - hydroxy-3-naphthoic(5′-chloro-2′:4′-dimethoxyanilide), 1-p-tolyl-3-methyl - pyrazolone, acetoacet-2:4-dimethylanilide, acetoacet-p-phenetidide, acetoacet-o-chloranilide and acetoacet-4-chloro-2:5 dimethoxyanilide.

The azo colouring matters of the invention may also be formed in situ on textile materials. For example textile materials may be impregnated with an alkaline solution of the coupling component and treated with a solution of the diazotised amine (or a stable salt thereof such as a zinc chloride complex) to form the insoluble colouring matter on the fibre. If desired, the diazonium salt may be converted to a stable derivative such as a diazoamino compound and applied to textile materials in admixture with the coupling component, the insoluble colouring matter being subsequently developed on the fibre, for example by an acidic after treatment or by neutral steaming.

The invention is illustrated but not limited by the following examples in which the parts are by weight.

EXAMPLE 1

A suspension of 2.35 parts of 7-amino-4:6-dimethyl-2-hydroxyquinoline in 40 parts of water is stirred with 4.5 parts of 10 N hydrochloric acid at 0° C. and diazotised by adding a solution of 0.88 part of sodium nitrite in 6.3 parts of water. The diazonium solution is filtered and 5 parts of sodium acetate crystals and 5 parts of glacial acetic acid are added. A solution of 4.25 parts of 2-hydroxy-3-naphthoic(4'-methoxy-2'-methylanilide) in 300 parts of water and 4 parts of 10 N potassium hydroxide solution is added to the diazo solution with stirring. The mixture is then stirred for 1 hour and the temperature is slowly raised to 70° C. and maintained for a further 1 hour. The red pigment is filtered off while hot, washed well with cold water and dried at 50° C. When incorporated into paints the resulting pigment has very good fastness to heat, to light and to solvents.

EXAMPLE 2

In place of the 4.5 parts of 2-hydroxy-3-naphthoic(4'-methoxy-2-methylanilide) used in Example 1 there is used 2.18 parts of 1-phenyl-3-methyl-5-pyrazolone. When incorporated into paint media the resulting pigment gives orange shades of very good fastness to heat.

EXAMPLE 3

In place of the 2.35 parts of 7-amino-4:6-dimethyl-2-hydroxyquinoline and 4.25 parts of 2-hydroxy-3-naphthoic (4'-methoxy-2'-methylanilide) used in Example 1 there are used 2.35 parts of 7-amino-4:5-dimethyl-2-hydroxyquinoline and 3.5 parts of acetoacet-4-chloro-2:5-dimethoxyanilide. When incorporated into paints the resulting pigment gives reddish-yellow shades of very good fastness to light and to solvents.

EXAMPLE 4

A suspension of 2.55 parts of 7-amino-6-methoxy-2-hydroxy-4-methylquinoline in 40 parts of water is stirred with 4.5 parts of 10 N hydrochloric acid at 0° C. and diazotised by adding a solution of 0.88 part of sodium nitrite in 0.3 part of water. 5 parts of sodium acetate crystals and 5 parts glacial acetic acid are added to the diazonium suspension which is then added to a solution of 2-hydroxy-3-naphthoic(4'-chloro-2'-methylanilide) in 300 parts of water and 4 parts of 10 N potassium hydroxide. The mixture is stirred for 1 hour, heated slowly to 70° C. and stirred at this temperature for a further 1 hour. The deep blue black pigment is filtered off while hot, washed well with cold water and dried at 50° C. When incorporated into paint media it has very good fastness to heat, light and solvents.

The shades of the colouring matters obtained by coupling the diazonium salts of various 7-amino-2-hydroxy-4-methylquinoline derivatives with various coupling components are shown in the following table.

| Amine | Coupling Component | Shade |
| --- | --- | --- |
| 7-amino-2-hydroxy-4:6-dimethyl quinoline. | acetoacet-4-chloro-2:5-dimethoxy-anilide. | yellow. |
| Do | acetoacet-2:4-dimethyl-anilide. | greenish-yellow. |
| Do | acetoacetanilide | Do. |
| Do | acetoacet-o-chloranilide | yellow. |
| Do | acetoacet-4-chlor-2-methyl-anilide. | Do. |
| Do | acetoacet-2:4-dimethoxy-anilide. | Do. |
| Do | acetoacet-p-phenetidide | greenish-yellow. |
| Do | acetoacet-2:4:6-trichloro-anilide. | yellow. |
| Do | acetoacet-4-chloro-2-methoxyanilide. | Do. |
| 7-amino-2-hydroxy-4:6-dimethyl quinoline. | acetoacet-4-chloro-3-methoxyanilide. | yellow. |
| Do | 2-hydroxy-3-naphthoic(5'-chloro-2'-methylanilide). | red. |
| Do | 2-hydroxy-3-naphthoic(2'-methylanilide). | deep red. |
| Do | 2-hydroxy-3-naphthoic (4'-methoxyanilide). | Do. |
| Do | 2-hydroxy-3-naphthoic(5'-chloro-2':4'-dimethoxy-anilide). | maroon. |
| Do | 2-hydroxy-3-naphthoic(4'-chloro-2'-methylanilide). | deep red. |
| 7-amino-2-hydroxy-4:5-dimethylquinoline. | acetoacet-2:4-dimethyl-anilide. | yellow-orange. |
| Do | acetoacet-p-phenetidide | Do. |
| Do | 1-p-tolyl-3-methyl-5-pyrazolone. | orange. |
| Do | 2-hydroxy-3-naphthoic(4'-chloro-2'-methylanilide). | deep red. |
| Do | 2-hydroxy-3-naphthoic(4'-methoxyanilide). | reddish-maroon. |
| Do | 2-hydroxy-3-naphthoic(2'-methyl-4'-methoxy-anilide). | deep red. |
| Do | 2-hydroxy-3-naphthoic(5'-chloro-2':4'-dimethoxy-anilide). | maroon. |
| 7-amino-6-methoxy-2-hydroxy-4-methylquinoline. | acetoacet-4-chloro-2:5-dimethoxy anilide. | reddish-yellow. |
| Do | acetoacet-2:4-dimethyl-anilide. | yellow. |
| Do | acetoacet-o-chloranilide | reddish-yellow. |
| Do | acetoacet-p-phenetide | yellow. |
| Do | 1-phenyl-3-methyl-5-pyrazolone. | yellowish-red. |
| Do | 1-p-tolyl-3-methyl-5-pyrazolone. | orange. |
| Do | 2-hydroxy-3-naphthoic(2'-methylanilide). | dark blue. |
| Do | 2-hydroxy-3-naphthoic(4'-methoxyanilide). | Do. |
| Do | 2-hydroxy-3-naphthoic(2'-methyl-4'-methoxy-anilide). | Do. |
| Do | 2-hydroxy-3-naphthoic(5'-chloro-2':4'-dimethoxy-anilide). | Do. |
| 7-amino-2-hydroxy-4:5:8-trimethylquinoline. | acetoacet-4-chloro-2:5-dimethoxyanilide. | yellow. |
| Do | acetoacet-2:4-dimethyl-anilide. | Do. |
| Do | acetoacet-4:5-dichloro-2-methylanilide. | dull red. |
| Do | 1-p-tolyl-3-methyl-5-pyrazolone. | yellowish-red. |
| Do | 2-hydroxy-3-naphthoic(2'-methyl-4'-methoxy-anilide). | maroon. |
| Do | 2-hydroxy-3-naphthoic(5'-chloro-2':4'-dimethoxy-anilide). | Do. |
| Do | 2-hydroxy-3-naphthoic(4'-methoxyanilide). | Do. |
| 7-amino-6-chloro-2-hydroxy-4-methylquinoline. | 1-p-tolyl-3-methyl-5-pyrazolone. | orange. |
| Do | 2-hydroxy-3-naphthoic(2'-methyl-4'-methoxy-anilide). | maroon. |
| Do | 2-hydroxy-3-naphthoic(4'-methoxyanilide). | Do. |
| Do | 2-hydroxy-3-naphthoic(5'-chloro-2':4'-dimethoxy-anilide). | Do. |
| Do | 2-hydroxy-3-naphthoic(4'-chloroanilide). | Do. |
| Do | 2-hydroxy-3-naphthoic(4'-chloro-2'-methylanilide). | deep red. |
| Do | acetoacet-2:5-dimethoxy-anilide. | yellow. |
| Do | acetoacet-5-chloro-2-methyl-anilide. | greenish-yellow. |
| Do | acetoacet-4-ethoxyanilide | reddish yellow. |
| Do | acetoacet-2:4-dimethyl-anilide. | bright greenish yellow. |
| Do | acetoacet-4-chloro-2:5-dimethoxyanilide. | yellow. |
| Do | acetoacet-o-chloroanilide | greenish yellow. |

The aminoquinoline compounds used in the above Examples may be obtained as follows:

7-Amino-2-Hydroxy-4:6-Dimethylquinoline 305 parts of 2-methyl-1:4-phenylenediamine and 380 parts of ethyl acetoacetate are mixed in an apparatus arranged for distillation. The temperature is raised to 130° C. during 2 hours and is then maintained between 130° and 150° C. for a further 4 hours, during which time 145 parts of liquid distil. The viscous residue is poured into a mixture of 400 parts of concentrated hydrochloric acid and 3000 parts of water and the mixture is then boiled under reflux for 4 hours. A little powdered carbon is added and the solution is filtered hot. Sufficient sodium chloride is added to the filtrate to give a 15% solution and after cooling to 20° C. the solid which precipitates is filtered off. It is purified by dissolving a mixture of 2000 parts of water and 225 parts of concentrated hydrochloric acid, adding carbon, filtering and neutralising the filtrate with sodium hydroxide solution. The purified product has a melting point of 350° C. (with decomposition).

*7-Amino-2-Hydroxy-4:5-Dimethylquinoline*

24.4 parts of 3:5-diaminotoluene is stirred at between 60° and 70° C. with 100 parts of toluene and when dissolved a solution of 18.7 parts of diketene in 50 parts of toluene is added during 1 hour, the heat of reaction keeping the temperature between 60° and 70° C. After cooling to 20° C. the product is filtered and washed first with toluene and then with petroleum ether. 51 parts of the product so obtained, 250 parts of water and 40 parts of concentrated hydrochloric acid are mixed in an apparatus arranged for distillation and heated until 30 parts of liquid have distilled and the temperature of the residual liquid has risen to 100° C. A little powdered carbon is added to the residue which is filtered while hot and cooled to 20° C. The hydrochloride of the required amine crystallises and is filtered off. It is then dissolved in boiling dilute hydrochloric acid and the solution made alkaline with ammonia to precipitate the free base. The product has a melting point of 261° to 271° C.

*7-Amino-6-Methoxy-2-Hydroxy-4-Methylquinoline*

138 parts of 2:4-diaminoanisole and 280 parts of ethyl acetoacetate are mixed in an apparatus arranged for distillation and heated as rapidly as possible to 130° C. and then slowly to 140° C. during 2 hours. 90 parts of ethyl alcohol distils. The viscous residue is poured into a mixture of 1000 parts of water and 160 parts of concentrated hydrochloric acid and the mixture distilled until 200 parts of distillate are obtained. Sodium acetate is added to the hot residue until it is no longer acid and the mixture is cooled to 20° C. The sticky solid which precipitates is filtered, washed with water, treated with 500 parts of hot ethyl alcohol and finally crystallised from 400 parts of glacial acetic acid. The solid product has a melting point of 348° to 350° C.

*7-Amino-2-Hydroxy-4:5:8-Trimethylquinoline*

134 parts of 2:5-dimethyl-1:3-phenylenediamine is dissolved in 400 parts of toluene and the solution added at between 60° and 70° C. to a solution of 188 parts of diketene in 188 parts of toluene. After stirring for 16 hours the solid is filtered off and washed first with toluene and then with petroleum ether. 127 parts of the product so obtained is stirred with 400 parts of water and 400 parts of concentrated hydrochloric acid and heated slowly to 95° C. and then maintained at between 95° and 100° C. for 4 hours. 620 parts of sodium acetate crystals are added and the mixture is cooled to 20° C., filtered and the product washed on the filter with 200 parts of saturated aqueous sodium chloride solution. The solid is dissolved at 95° C. in 500 parts of water and 30 parts of concentrated hydrochloric acid, a little carbon is added and the solution is filtered and cooled. The hydrochloride which crystallises is filtered off, washed with sodium chloride solution, re-dissolved in 500 parts of water at between 80° and 85° C. and the free base is precipitated by addition of ammonia. It is filtered, washed well and dried. This amine has a melting point of 277° to 279° C.

*7-Amino-6-Chloro-2-Hydroxy-4-Methylquinoline*

84 parts of diketen are stirred with 150 parts of toluene and 72 parts of 4-chloro-m-phenylenediamine are added at such a rate that heat of reaction takes the temperature to between 60° and 70° C. After stirring for a further 1 hour at between 60° and 70° C. the mixture is cooled to 15° C., and the crystalline precipitate of the N:N-di(acetoacetyl) compound is filtered from the toluene. The crystals are added to 500 parts of water and 100 parts of 36% aqueous hydrochloric acid and the mixture is distilled until the temperature of the boiling solution rises to 100° C. and then heated at 100° C. for a further 2 hours. Decolourising carbon is added and the solution is filtered hot from the carbon and the filtrate cooled to 15° C. The hydrochloride of 7-amino-6-chloro-2-hydroxy-4-methylquinoline which crystallises is filtered off and converted to the free base by boiling for 1 hour with a solution of 50 parts of sodium acetate crystals in 500 parts of water, cooling to room temperature, filtering and washing with cold water. The product has a melting point of 280° C. (with decomposition).

What we claim is:
Compounds having the formula:

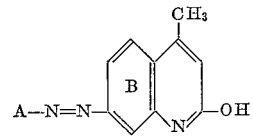

wherein A stands for an acetoacetanilide coupling component radical free from sulphonic acid and carboxylic acid groups, and B is substituted by a methyl group.

References Cited in the file of this patent
UNITED STATES PATENTS

| | | |
|---|---|---|
| 2,173,056 | Hitch et al. | Sept. 12, 1939 |
| 2,754,293 | Brody et al. | July 10, 1956 |

FOREIGN PATENTS

| | | |
|---|---|---|
| 1,164,476 | France | Oct. 9, 1958 |

OTHER REFERENCES

Colour Index, 2nd Ed., vol. 2, pp. 2613–2628, 1956.
Berichte der Deut. Chem. Gesell, 1898, vol. 31, page 796.